Oct. 27, 1931.   C. F. MEYER   1,829,365
SAFETY GAS COCK
Filed May 2, 1930
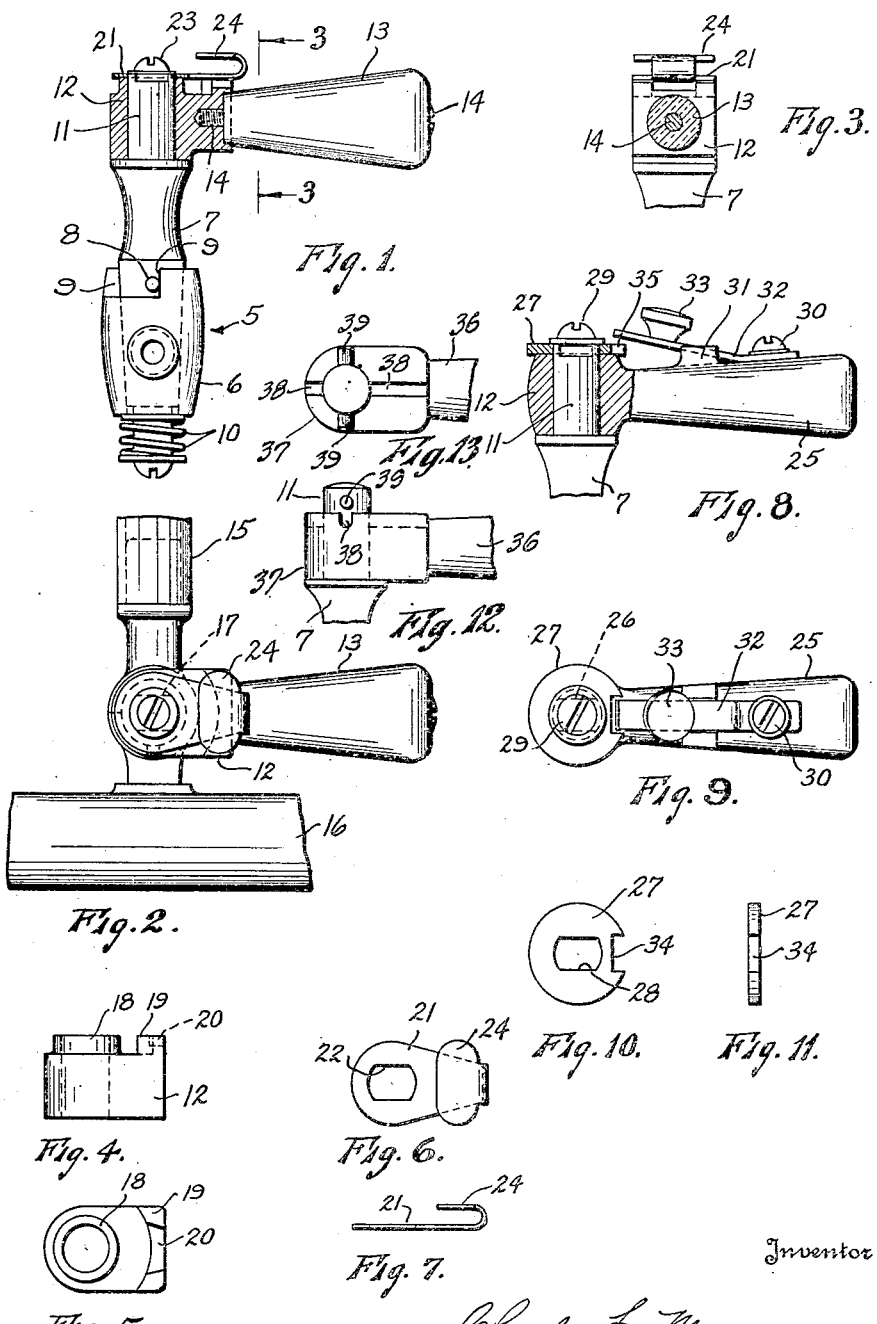

Patented Oct. 27, 1931

1,829,365

UNITED STATES PATENT OFFICE

CHARLES F. MEYER, OF BRIDGEPORT, CONNECTICUT

SAFETY GAS COCK

Application filed May 2, 1930. Serial No. 449,223.

This invention relates to new and useful improvements in safety gas cocks.

An object of the invention is to provide a gas cock wherein the handle is free to rotate on the valve spindle whereby the gas will not be casually or accidentally turned on, said cock including spring means operable to lock the handle to the spindle whereby the gas may be turned on when desired.

A further object is to provide a safety device as stated, the spring means being depressible to lock the handle to the spindle and being operable by a digit of the hand used to turn the cock handle.

An additional object is to provide a safety cock as stated and which is simple in construction, cheap to manufacture and easy to operate.

Other objects and advantages will become apparent from a consideration of the following detailed description taken in connection with the accompanying drawings. While satisfactory embodiments of the invention are shown and will be described in detail, it will be understood that the invention is not limited to the details disclosed and that references must be made to the claims for a definition of the limitations of the invention.

In the drawings

Fig. 1 is a view partly in elevation and partly in section showing the invention applied to a gas cock.

Fig. 2 is a plan view of the safety cock shown in Fig. 1, the same being shown associated with a gas line.

Fig. 3 is a sectional view on the line 3—3 of Fig. 1.

Fig. 4 is an elevation view of the handle boss.

Fig. 5 is a plan view of the boss of Fig. 4.

Fig. 6 is a plan view of the spring plate for connecting the handle to the valve spindle.

Fig. 7 is a side elevational view of the spring plate of Fig. 6.

Fig. 8 is a view similar to Fig. 1 but showing a modification.

Fig. 9 is a plan view of the device as shown in Fig. 8.

Fig. 10 is a plan view of the washer plate.

Fig. 11 is an edge view thereof.

Fig. 12 is a side elevation of a modified construction, and

Fig. 13 is a plan view thereof.

Referring in detail to the drawings, at 5 is shown a gas cock including a shell or body portion and a plug 6 on the lower end of a spindle 7 carrying a pin 8 operating between limiting shoulders 9 and held within the body by a coil spring 10 surrounding its lower end.

At its upper end the spindle 7 is reduced as at 11 and rotatably mounted on the reduced portion 11 is the boss 12 of a handle 13. Handle 13 is secured to boss 12 by any suitable means as by means of a screw 14. The cock 5 may be interposed in a gas supply pipe or conduit 15 leading to a burner (not shown) of a gas stove, a portion of which is shown at 16, or the cock may be used in other connections.

Since the handle boss 12 is free to turn on the reduced portion of the spindle 7 it will be apparent that a casual turning of the handle will not result in the gas being turned on. This is the purpose of the invention, and means are provided whereby the handle may be locked to the spindle for operating it when desired.

To this end the upper portion of the spindle has its sides flattened as at 17 whereby it is non-circular. Further, the boss 12 includes an extension 18 and a lug 19 notched as at 20. A spring plate member 21, having an opening 22, also non-circular and shaped to fit over the end 17 of the spindle and be held against rotation thereon, rests on the extension 18, being secured as by a screw 23.

Spring plate 21 preferably has its free end doubled upon itself and preferably widened to provide a thumb or finger piece 24 to be engaged by the operator. It will be noted that the extension 18 spaces the spring plate above the notch 20 of the lug 19.

The parts being assembled as described, when it is desired to open the cock it is but necessary that the spring 21 be depressed by engaging the thumb or finger piece, to locate the spring in the notch 20 of the boss.

This locks the handle and spindle together and the gas may be turned either on or off with the parts thus locked. However, upon the pressure being released from the spring it moves out of the notch leaving the handle free to turn on the spindle 7.

In Figs. 8, 9, 10 and 11 a slightly modified form of the invention is shown. Here, the spindle 7 has the reduced portion 11 on which the boss 12 of the handle 25 is freely turnable. The upper end 26 of the spindle has opposite sides flattened whereby the washer plate 27, having a non-circular hole 28, may be secured over the end portion 26 of the spindle. A screw 29 may be used to hold washer plate 27 in place.

It will now be obvious that washer plate 27 turns with the spindle 7. Secured to handle 25 as by a screw 30 and guided between lugs 31 is a spring or key 32 provided with a button 33 to be engaged by a thumb or finger. The washer plate 27 is provided with a notch 34 of a shape and size to receive a portion of the spring 32.

Since the handle 25 is freely turnable on the spindle 7, some means must be provided to lock these parts together when it is desired to turn the gas on or off. The parts are locked together by depressing spring 32 through pressure which may be applied through button 33 by a finger or thumb. This causes the end portion of spring 32 to enter the notch 34 in the washer plate 27, locking the handle and spindle together.

It should be noted that spring 32 is to be depressed until its end portion engages the upper edge of boss 12, as at 35, at which time the spring will be fully within the notch 34, and this shoulder 35 limits the downward movement of the spring.

In the form shown in Figs. 12 and 13 the handle 36 is free to turn on the spindle 11 of the valve plug as in the other forms, but the head or boss portion 37 is provided in its top wall with one or more notches 38 to receive one or more pins 39 projecting from the side of the spindle 11. The pin or pins 39 are normally spaced above the boss or head portion 37 as shown in Fig. 12, but when it is desired to operate the valve plug it is necessary to lift the handle so that the notch or notches 38 receive the pin or pins 39 to lock the handle to the spindle. Then of course, turning the handle will turn the valve plug. As soon as the handle is released it will drop downwardly removing the notch or notches 38 from the pin or pins 39 and thus automatically unlocking the handle from the spindle.

Having thus described the invention, what is claimed is:

1. In a safety gas cock, a body, a plug within the body for turning on and shutting off the flow of gas therethrough, a spindle member for operating said plug, a handle member freely rotatable on said spindle, a notch in one of said members, a flat spring secured to and movable with the other of said members, and said spring adapted to be depressed without depressing the handle, to move the spring partially into the notch to lock the handle member and spindle member together.

2. In a safety gas cock, a body, a plug within the body for turning on and shutting off the flow of gas therethrough, a spindle member for operating the plug, a handle member freely rotatable on the spindle, and cooperating means of the upper sides of said members and one of said cooperating means vertically depressible without depressing the handle to lock the handle and said spindle together, said means on being released adapted to move to unlock the spindle and handle.

3. In a safety gas cock, a body, a plug within the body for turning on and shutting off the flow of gas therethrough, a handle for operating said plug, said handle freely turnable independently of the plug, and a flat spring depressible to itself form a connection to lock the handle and plug together.

4. In a safety gas cock, a body, a plug within the body for turning on and shutting off the flow of gas therethrough, said plug having an extension forming a spindle, a handle freely turnable on the spindle, said handle having a notch, a spring means secured to and movable with the spindle, and said spring means adapted to be depressed to bodily enter the notch to lock the handle and spindle together.

5. In a safety gas cock, a body, a plug within the body for turning on and shutting off the flow of gas therethrough, a spindle for operating the plug, a handle freely turnable on the spindle, said handle having a notch in its upper side, and spring means secured to the upper end of the spindle to turn with the spindle, said spring means adapted to be depressed to enter the notch in the handle to lock the handle and spindle together.

6. In a safety gas cock, a body, a plug within the body to control the flow of gas therethrough, a spindle for operating said plug, a handle freely turnable on the spindle, a notch in the upper side of the handle, a spring secured to the upper end portion of the spindle to turn therewith, said spring formed from a flat piece bent upon itself to form a finger piece disposed above the body of the spring, and said spring adapted on pressure being applied to the finger piece, to be depressed into the notch in the handle to lock the spindle and handle together.

7. In a safety gas cock, a body, a plug within the body for turning on and shutting off the flow of gas therethrough, a spindle for operating the plug, a handle freely turnable on the spindle, a spring means secured to the upper side of the handle and movable therewith, a notch at the upper end of the spindle and movable therewith, said spring means normally free of said notch, and said spring means adapted to be depresesd to enter the notch and lock the handle and spindle together.

8. In a safety gas cock, a body, a plug within the body for turning on and shutting off the flow of gas therethrough, a spindle for operating the plug, a handle freely turnable on the spindle, a flat spring secured to the upper side of the handle and movable therewith, notched means on the upper end of the spindle and movable therewith, said flat spring normally free of the notch, and said spring adapted to be depressed to have its free portion enter the notch and lock the handle and spindle together.

In testimony whereof I affix my signature.

CHARLES F. MEYER.